US006439464B1

(12) United States Patent
Fruhauf et al.

(10) Patent No.: US 6,439,464 B1
(45) Date of Patent: Aug. 27, 2002

(54) DUAL MODE SMART CARD AND ASSOCIATED METHODS

(75) Inventors: Serge F. Fruhauf, Saratoga, CA (US); Herve Goupil, Provence; Robert Leydier, La Londe les Maures, both of (FR)

(73) Assignees: STMicroelectronics, Inc., Carrollton, TX (US); Schlumberger Malco, Inc., Owings Mills, MD (US)

( * ) Notice: Subject to any disclaimer, the term of this patent is extended or adjusted under 35 U.S.C. 154(b) by 34 days.

(21) Appl. No.: 09/686,925

(22) Filed: Oct. 11, 2000

(51) Int. Cl.[7] ................................................. G06K 19/06
(52) U.S. Cl. ....................................................... 235/492
(58) Field of Search .......................................... 235/492

(56) References Cited

U.S. PATENT DOCUMENTS 5,847,372 A * 12/1998 Kreft ........................... 235/492
6,168,077 B1 * 1/2001 Gray et al. ................... 235/375

FOREIGN PATENT DOCUMENTS

WO          99/49415          9/1999    ........ G06K/19/00
WO      WO 200016255 A1 *   3/2000    ......... G06K/7/016

* cited by examiner

Primary Examiner—Karl D. Frech
Assistant Examiner—April Nowlin
(74) Attorney, Agent, or Firm—Lisa K. Jorgenson; Christopher F. Regan (57) ABSTRACT

A dual-mode IC is provided for operating in first mode such as an ISO mode in accordance with International Standards Organization 7816 (ISO 7816) protocol, and a second, non-ISO mode, such as a USB mode in accordance with Universal Serial Bus (USB) protocol. The dual-mode IC is preferably in a smart card and includes a microprocessor, a switching block, and an external interface. The external interface includes a voltage supply pad, a reference voltage pad, a reset pad, a clock pad and an input/output pad in accordance with the ISO 7816 protocol, and a D-plus pad and D-minus pad in accordance with the USB protocol. The IC further includes a mode configuration circuit for detecting a USB mode condition on at least one of the D-plus and D-minus pads, and configuring the IC in the ISO mode or the USB mode depending on the result. Once the IC is configured in a particular mode, it will operate in only that mode until the next power-on reset sequence.

37 Claims, 5 Drawing Sheets

DUAL MODE SMART CARD AND ASSOCIATED METHODS

FIELD OF THE INVENTION

The present invention relates to information processing and storage, and more particularly, to smart card systems using various protocols.

BACKGROUND OF THE INVENTION

Smart cards SC are plastic cards having an embedded Integrated Circuit (IC). That IC may be a logic circuit with its associated memories or a microcontroller with its associated memories and software, or a microcontroller with its associated memories and software coupled to a custom block.

To use the computing power given by the IC, a SC makes use of a full set of packaging technologies. The die size varies from 1 $mm^2$ to 30 $mm^2$. The die size is limited for mechanical aspects going with the plastic nature of the SC. The IC is attached to a lead frame and wire-bonding techniques are used to connect the IC pads to the lead frame contacts. Potting and other strengthening methods protect the IC against chemical and mechanical stresses. Contacts are located on one side of the card and their number is limited to eight. Ultimately SC performs transactions with a SC reader using a serial protocol. All the mechanical and electrical specifications of SC are published by the International Standard Organization (ISO). The ISO7816-X standards have allowed the simple and massively produced magnetic stripe cards to evolve toward the SC. SC, depending of the IC complexity, may perform pre-paid accounting, cryptographic scheme, personal authentication using PIN code or biometrics and run java scripts to name few.

ISO documents ISO 7816-1 Physical Characteristics, ISO 7816-2 Dimensions and Locations of the contacts, ISO 7816-3 Electronic signals and transmission protocols and, ISO 7816-10 Electronic signals and answer to reset for synchronous cards are incorporated herein by reference.

Today all the SC readers have to be recognized by the infrastructure prior to perform any transaction involving a SC. The infrastructure is running an application in which the SC end is involved. The SC reader expects a SC. The half duplex protocol between the SC and the SC reader, in which, either the SC sends information to the SC reader or vice versa, cannot start until a SC is detected in place into the SC reader. The infrastructure manages authentication or transactions for pre-paid cards in public telephony, for Bank cards in Point Of Sale (POS) terminals and Automatic Teller Machines (ATM), for Pay TV providers in set top boxes and for wireless telecom operators in Subscriber Identification Modules (SIM) in Global System for Mobile (GSM) terminals. Except for SIM cards, all others applications use a physical sensor to detect the SC. This sensor tells the SC reader when a SC is in place that is when the SC lead frame contacts are able to mate with the SC reader contacts. Two sorts of SC reader contacts can be used, contacts that remain in place and because of their elasticity can slide over the SC when inserted in the SC reader or mobile contacts which descend to touch the lead frame contacts once the card has been detected in place. When the SC reader has established that a SC is in place the power up sequence can start at the SC reader convenience. After the power up sequence, the SC reader will provide first a clock to the SC and then will release its reset signal. The SC is then able to execute the stored Operating System (OS). The SIM card is particular since it is put in place only once with the power off and used constantly.

The first application ever to have deployed the SC technology more than 20 years ago is the public telephone system. The die size used in this application is less than 1 $mm^2$. Just memories and logic circuits are integrated in the IC. In 1999, Pre-paid SC accounted for more than ⅔ of the millions SC produced worldwide. The SC reader utilizes all eight contacts to interface properly with the different SC generations. When a SC is inserted in the payphone, the telephone infrastructure authenticates the SC and the telephone remove units out of the SC. It is worth noting that the SC developed for Banking applications can be utilized in a payphone. The payphone does not remove units out of a Bank card but bills the SC carrier.

The second largest application using the SC has been deployed by the Banking industry. The ATM and POS infrastructures have been installed in most countries other than the USA. The die size used in this application is about 10 $mm^2$. A microcontroller and its associated memories and software are integrated in the IC. The SC reader utilizes up to six contacts to interface properly with the different SC generations. When a SC is inserted in the ATM or the POS, the SC carrier is asked to authenticate himself with a PIN code. The SC can store anything like the balance of cash the owner got out of an ATM on a per week basis, the details of purchases he has done since the last closing date, etc. Based on this information, the authorization can be issued on the spot once the PIN has authenticated the debtor without any telephone calls to the bank. Ultimately Banks and Businesses perform the equalization using the telephone, private communication networks and some day the Internet. While performing the equalization, a black list of fraudulent SC may be stored in the POS or ATM. This scheme has been able to reduce the fraud level down to 0.02% of all the transactions equivalent money done with the SC from 0.2% when no IC was embedded in the card. The level of fraud using SC has been reduced by ten fold compared to the regular credit cards.

The third largest application using SCs has been deployed by GSM manufacturer. The die size used in a SIM is about 30 $mm^2$. A microcontroller and its associated memories and software are integrated in the IC. The SIM reader utilizes five contacts to interface properly with the SC. The most sophisticated SC applications are performed in GSM using Java applets.

A whole new market for the SC is now emerging with the Internet accessed from a Personnel Computer. Secure message, Public Key Infrastructure, Authentication and Electronic Payment are the new SC hot areas. The SC can be an e-commerce facilitator. The differentiation of the smartcard compared to other solutions is to have the PIN in the memory that is never communicated in any transaction.

Up to now, the SC is used in a SC reader connected to the computer. Two protocols are involved in supporting transactions between the SC and the application run by the computer. The first protocol complies with the ISO-7816-3. This standard provides detailed requirements for the serial interface between SC and SC reader. The reader is connected to the computer by via a Serial Port, a Parallel Port or even the Universal Serial Bus (USB) using a second protocol. The SC reader contains electronic circuits and embedded software that enable communication between the SC using the first protocol and the computer using the second protocol. The computer is loaded with the appropriate driver to support the SC reader. Many countries have started to use the SC in the PC environment. The die size used in this application will be anywhere from 5 $mm^2$ to 30 $mm^2$. A microcontroller and its associated memories and software are integrated in the IC with a cryptocontroller. Sometimes, a bio-sensor will be also integrated. The SC reader utilizes at least five contacts to interface properly with the SC.

Closed infrastructures enabling all kinds of transactions like Healthcare, Public phone, parking, Loyalty programs, Cash payments, Credit payments are using millions of ISO compliant SC readers around the world. Europe has lead the development of these technologies back in the late 1970's. In these proprietary infrastructures, every single SC reader is designed to carry many transactions each hour. The many users share the cost of the SC reader.

The extreme growths of the e-commerce and Internet transactions have highlighted the huge needs to secure transactions. Fraud is booming. False credit card numbers are used, credit card numbers are stolen and eavesdropping on the Internet is well established. Dotcom companies search for the device having the best cost/performance ratio. The SC is an excellent contender if the SC reader price can be reduced.

The USB has recently become firmly established and has gained wide acceptance in the Personal Computer (PC) marketplace. The USB has been developed in response to a need for a standard interface that extends the concept of "plug and play" to devices external to a PC. It has enabled users to install and remove external peripheral devices without having to open the PC case or to remove power from the PC. The USB provides a low-cost, high performances, half-duplex serial interface that is easy to use and readily expandable. The USB can be seen as a set of four wires carrying the supply power with two wires and data with the two other wires. The USB is currently defined by the Universal Serial Bus Specification written and controlled by USB Implementers Forum, Inc., a non-profit corporation founded by the group of companies that developed the USB Specification.

In particular, Chapter 5 USB Data Flow Model, Chapter 7 Electrical, Chapter 8 Protocol Layer and Chapter 9 USB Device Framework of Universal Serial Bus Specification are incorporated herein by reference. The increasingly widespread use of the USB in computers has led SC reader manufacturers to develop USB interfaces for connection of their products to computers to complement the existing serial and parallel interfaces.

We are now in a situation where the brick and mortar companies and the Banks have been using the SC technology for more than 25 years. On the other hand, the Internet, a formidable arena to enhance commerce and Banking activities, does not use the SC technology. Most of the Internet transactions are done from a PC and despite PC manufacturer efforts, the PC industry has failed to install on each PC a cost effective SC reader meeting the specific needs of web related applications. A comprehensive solution, servicing the needs of both the one already engaged in the SC technologies and those wishing to benefit from it, is to be found. These two fields should share a common authentication platform in the best interests of the customers and the service providers.

An example of a conventional approach may be found in published PCT application WO 99/49415 and entitled "Versatile Interface Smart Card." The system discloses a smart card system which can be used with different protocols. Specifically, the system provides a mode signal at one of the non-ISO standard contacts to indicate the protocol of the device that the card is communicating with. However, the mode signal is not checked until after the smart card is powered up and the reset signal has been applied. In other words, the smart card is already operating in the ISO 7816 protocol, and upon detection of the mode signal, may have to switch to a non-ISO protocol.

SUMMARY OF THE INVENTION

In view of the foregoing background, it is therefore an object of the invention to provide an integrated circuit which can operate according to more than one protocol.

It is a further object of the invention to provide a smart card system that can determine whether the smart card is communicating with a device using the ISO 7816 protocol or the USB protocol, and configure the smart card in such a protocol.

This and other objects, features and advantages in accordance with a first embodiment of the present invention are provided by a dual-mode IC for operating in first mode such as an ISO mode in accordance with International Standards Organization 7816 (ISO 7816) protocol, and a USB mode in accordance with Universal Serial Bus (USB) protocol. The dual-mode IC is preferably in a smart card and includes a microprocessor, a switching block, and an external interface. The external interface comprises a voltage supply pad, a ground or reference voltage pad, a first set of pads for the first mode, and a second set of pads for the USB mode. The first set of pads preferably include a reset pad, a clock pad and an input/output pad in accordance with the ISO 7816 protocol, and the second set of pads preferably includes a D-plus pad and a D-minus pad in accordance with the USB protocol. The IC further includes a mode configuration circuit comprising a USB mode detector connected to at least one of the D-plus and D-minus pads. A pull-up resistor may be connected to one of the D-plus and D-minus pads, and a USB voltage detector may be connected to the voltage supply pad. A latching circuit is connected between the switching block and the USB mode detector, and a control register may be connected to the latching circuit for storing a mode configuration indicator.

The mode configuration circuit preferably configures the IC to operate in one of the ISO and USB modes while disabling the other of the ISO and USB modes. As such, the reset, clock and input/output pads are disabled when the IC is configured in the USB mode, and the D-plus and D-minus pads are disabled when the IC is configured in the ISO mode. Preferably, in the first embodiment, the mode configuration circuit configures the IC to operate in the ISO mode as a default if the USB mode detector does not detect the USB mode. However, in a second embodiment, an ISO detector is provided for detecting an ISO-mode condition. Here, the mode configuration circuit configures the IC in the mode detected by the USB detector or the ISO detector.

The USB mode detector may detect if a low speed USB device is connected to the D-plus and D-minus pads, and the USB voltage detector may detect whether a power supply on the voltage supply pad is greater than about 3.5 volts or preferably between about 4.01 and 5.5 volts. The ISO-mode detector may detect the rising of a signal on the reset pad as the ISO-mode condition. Of course, to ensure that the ISO-mode is detected, the ISO-protocol sequence may be detected via the reset, clock and I/O pads.

A method aspect of the present invention is directed to a method of operating a dual-mode IC in an ISO-mode in accordance with the ISO protocol, and a USB-mode in accordance with the USB protocol. The dual-mode IC includes an external interface having a voltage supply pad, a first set of pads in accordance with the ISO protocol, and a second set of pads in accordance with the USB protocol.

The method includes detecting whether a USB-mode condition exists on at least one pad of the second set of pads during a power-on-reset of the dual-mode IC. The method may also include verifying the USB-mode, when the USB-mode condition is detected, by detecting a USB-mode voltage on the voltage supply pad.

The dual-mode IC is configured in the USB mode and the first set of pads is disabled upon verification of the USB mode voltage. Also, according to the first embodiment, the method includes configuring the dual-mode IC in the ISO mode and disabling the second set of pads when the USB-mode condition is not detected. However, in accordance with the second embodiment, the method includes detecting whether an ISO-mode condition exists on one pad of the first set of pads. Here, the method includes configuring the dual-mode IC in the ISO mode and disabling the second set of pads when the ISO-mode condition is detected.

The first set of pads comprises a reset pad, a clock pad and an input/output pad in accordance with the ISO 7816 protocol. Also, the second set of pads comprises a D-plus pad and a D-minus pad in accordance with the USB protocol. Detecting whether the USB-mode condition exists may comprise detecting whether the second set of pads are connected to a USB device. Again, verifying the second mode may comprise detecting whether a power supply on the voltage supply pad is greater than about 3.5 volts, or preferably between about 4.1 and 5.5 volts. Furthermore, the method includes storing a mode configuration indicator for indicating whether the dual-mode IC is configured in the ISO or USB mode.

In the first embodiment, the IC is configured in the ISO mode by default if the USB mode is not detected on the second set of pads, such as the D-plus and D-minus pads. If a USB device is detected via the D-plus and D-minus pads during the power-on reset sequence, then the IC USB voltage is verified on the voltage supply pad before the IC is configured in the USB mode. Once the IC is configured in one mode, it can only operate in that mode and it cannot be changed except via another power-on reset sequence.

In the second embodiment, the IC is configured in the ISO mode if an ISO condition is detected on one of the first pads, such as the reset pad. Similar to the first embodiment, if a USB device is detected via the D-plus and D-minus pads during the power-on reset sequence, then the USB voltage is verified on the voltage supply pad before the IC is configured in the USB mode. However, unlike the first embodiment, the default is a neutral mode where the IC is not configured in either the ISO or USB mode. Once the IC is configured in one mode, it can only operate in that mode and it cannot be changed except via another power-on reset sequence.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
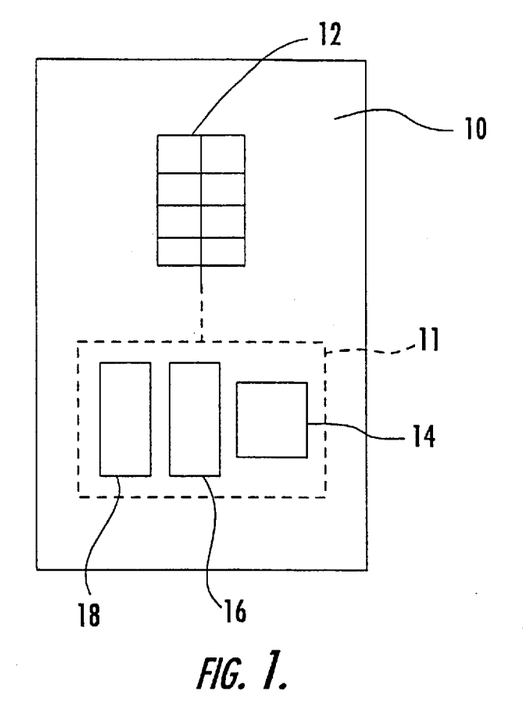
FIG. 1 is a schematic diagram of a smart card according to the present invention.

Referring to FIG. 1, a smart card 10 in accordance with the present invention will now be described. The smart card 10 is made of plastic, for example, and has a plurality of electrical contacts or pads 12 on an outer surface thereof, as would be appreciated by those skilled in the art. As shown, the card 10 includes eight pads 12, for example. The pads 12 are the external interface for the integrated circuit (IC) 11 which is embedded within the card 10 and typically beneath the pads. The size of the card 10 and the position of the pads 12 are determined by appropriate standards such as the ISO 7816 protocol discussed above. Of course the IC 11 can also be embedded in other media such as the Subscriber Identity Module (SIM) for mobile phones, a token or other wireless USB device.

Figure 2:
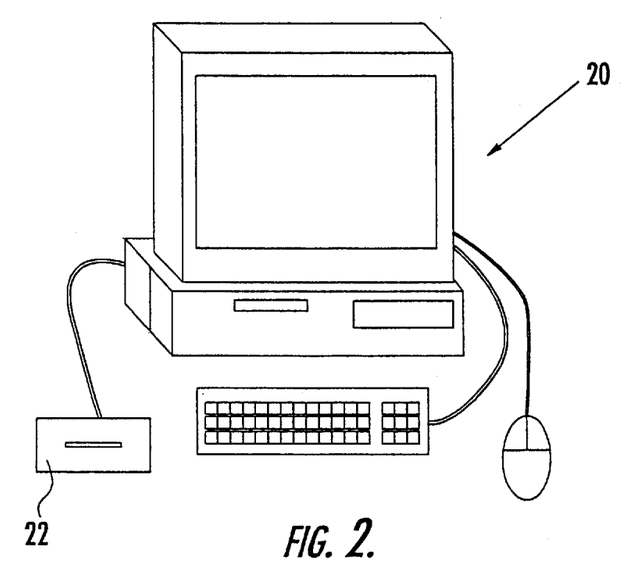
FIG. 2 is a schematic diagram of a personal computer having a smart card reader in accordance with the present invention.

A personal computer (PC) 20, as shown in FIG. 2, typically includes a central processing unit (CPU) and various input/output devices such as a monitor, keyboard and a mouse. Additionally, the PC 20 includes a smart card reader 22 which may, for example, be used to control access to the PC. As shown, the smart card reader 22 is a separate peripheral device; however, the smart card reader could also be incorporated into the CPU housing or the keyboard, for example.

The smart card reader 22 may conform to the ISO 7816 protocol or a non-ISO protocol such as the Universal Serial Bus (USB) protocol as discussed above. The ISO 7816 protocol is the conventional standard for use in smart cards and includes a voltage supply pad VCC, a ground pad GND, an input/output pad I/O, a reset pad RST and a clock pad CLK. The ISO protocol is characterized by an Answer-to-Reset (ATR) sequence when a power-on-reset or hardware reset is applied to the IC 11.

The USB protocol is currently being used to replace the different PC 20 interfaces for peripheral devices such as the mouse, keyboard, serial I/O port etc. The USB protocol can be hot plug and play which means that a USB protocol device can be connected or disconnected from the PC 20 without necessitating a reboot. The USB cable includes a voltage supply wire VBUS, a ground wire GND, a D-plus wire DP and a D-minus wire DM. The signal on DP and DM is a data stream in NRZI coding and includes the clock. The USB 1.1 specification requires the power supply of a USB device to be between 4.01V and 5.5V.

As set forth previously, it is desirable to provide a smart card system that can operate in the ISO 7816 protocol and another non-ISO protocol, such as the USB protocol, depending on the type of reader the card is communicating with. Thus, referring to FIG. 3, a first embodiment of the present invention will be described. A dual-mode IC 11 is capable of operating in first mode such as an ISO mode in accordance with International Standards Organization 7816 (ISO 7816) protocol, and a second non-ISO mode such as a USB mode in accordance with Universal Serial Bus (USB) protocol. The dual-mode IC 11 operates selectively in one mode or the other, but not both simultaneously.

Figure 3:
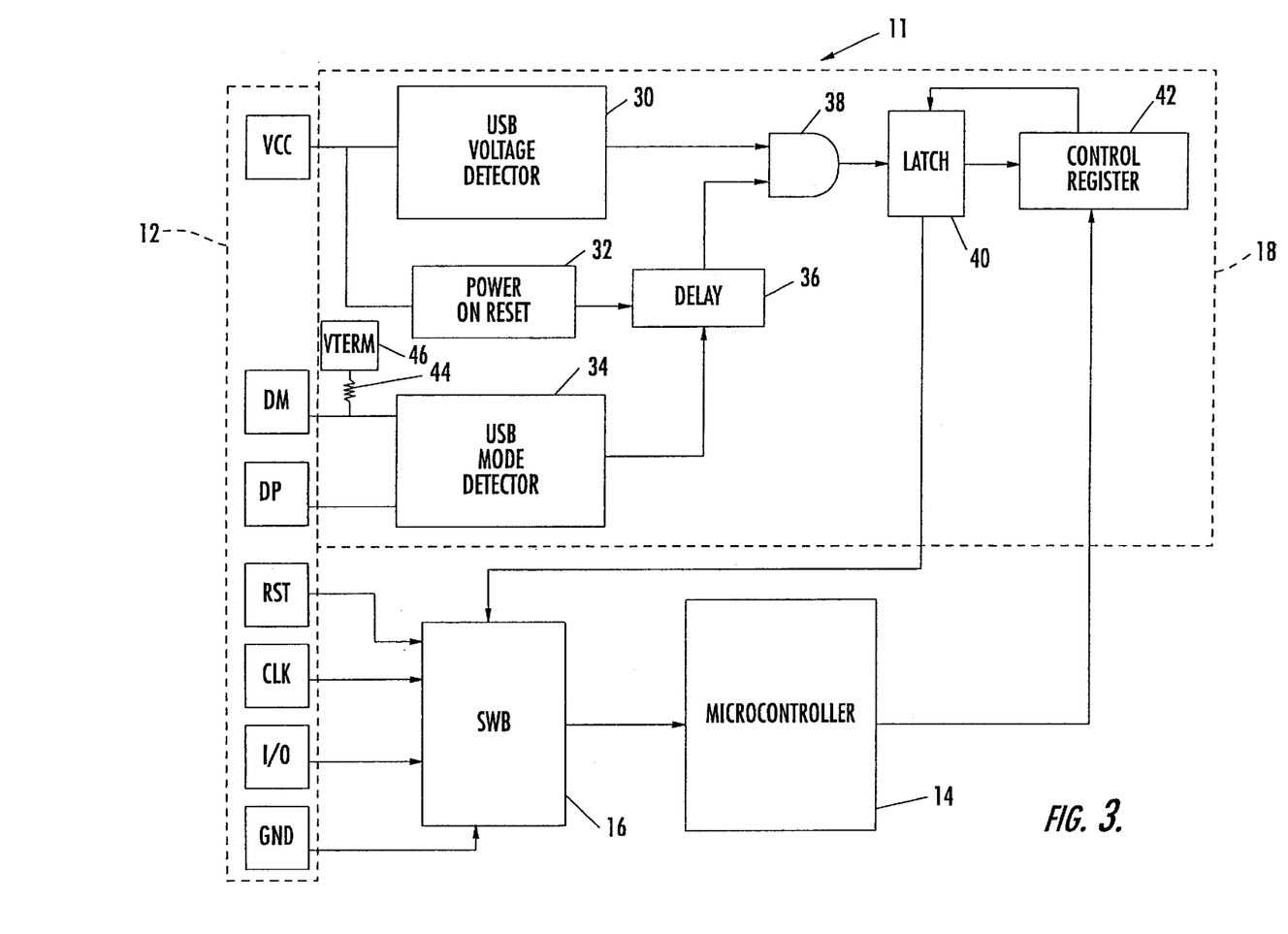
FIG. 3 is a schematic diagram of a dual-mode IC according to a first embodiment of the present invention.

The dual-mode IC 11 is preferably in the smart card 10 and includes a microprocessor 14, a switching block 16, and the external interface 12. The external interface 12 comprises a voltage supply pad VCC, a reference voltage/ground pad GND, a first set of pads for the ISO mode, and a second set of pads for the non-ISO mode. The first set of pads preferably include a reset pad RST, a clock pad CLK and an input/output I/O pad in accordance with the ISO 7816 protocol. The second set of pads preferably includes a D-plus pad DP and a D-minus pad DM in accordance with the USB protocol.

Because the IC 11 can only operate in one of the two modes which have different external interfaces, the IC will need to determine in which mode to operate. Thus, the IC 11 includes a mode configuration circuit 18 comprising a USB mode detector 34 connected to at least the D-minus pad.

The USB mode detector may also be connected to the D-plus DP pad as shown in FIG. 3. The mode configuration circuit 18 may also include a USB voltage detector 30 connected to the voltage supply pad VCC for detecting a USB mode voltage supply, a latching circuit 40 connected to the switching block and receiving outputs from the USB mode detector 34 and the USB voltage detector 30, and a control register 42 connected to the latching circuit 40 for storing a mode configuration indicator.

A delay block 36 may be connected between the USB mode detector 34 and the latching circuit 40, while a power-on-reset circuit may be connected between the voltage supply pad VCC and the buffer. The delay block 36 delays the detection by the USB mode detector 34 until a predetermined time, e.g. 1–10 ms, after first contact to avoid a false detection due to rebound. Also, a logic gate/circuit 38 may be connected between the latching circuit 40 and the detectors 30, 34. Furthermore, the USB 1.1 protocol requires a 1.5 KOhm resistor 44 connected between the D-minus pad DM and about 3.6V or VTERM from a voltage regulator to aid in the identification of a low-speed USB device, as would be appreciated by the skilled artisan.

During the start-up or power-on sequence of the IC 11, the mode configuration circuit 18 configures the IC 11 to operate in one of the ISO and USB modes while disabling the other mode. For example, the reset pad RST, clock pad CLK and input/output I/O pad are disabled when the IC 11 is configured in the USB mode, and the D-plus pad DP and D-minus DM pad are disabled when the IC 11 is configured in the ISO mode. To prevent any glitches, the detected mode is latched by the latching circuit 40 while the appropriate bit is set in the control register 42. Because the mode detection is a hardware detection, the operating system of the IC 11 will then check this bit during the reset routine to access the appropriate code for the latched mode.

Accordingly, if the smart card 10 including the dual mode IC 11 is used with a typical smart card reader, it will operate as specified in the ISO 7816 protocol while the USB interface, i.e. the D-plus DP and D-minus DM pads, is disabled to consume less power. However, because the IC 11 includes a USB interface, ISO 7816-like transactions can be performed using a low-cost USB device rather than an ISO-compliant smart card reader. Here, the ISO mode interface, i.e. the reset RST, clock CLK and input/output I/O pads, is disabled. Once the IC 11 is configured in one of the modes, it must stay in that mode until another power-on-reset.

For security and integrity of the dual-mode IC 11, the mode should be detected as soon as possible because once the IC is configured in a mode, it will not be changed until another power-on-reset is executed. In this embodiment, the IC 11 is configurable in the ISO mode by default. In other words, if the USB mode is not detected, then the mode configuration circuit 18 configures the IC 11 in the ISO mode and disables the USB mode and interface. To operate in the USB mode, the presence of a USB bus must be detected before an ATR of ISO 7816 occurs. In the USB protocol, a low-speed USB device is detected with a pull-up resistor, such as resistor 44, on DM. A downstream transceiver of a USB hub has a pull-down resistor connectable to the D-plus DP and D-minus pads DM. So, when the IC 11 is connected to a USB hub, a current would be sensed by the USB device and the IC 11 would be recognized as being low-speed on DM and/or high-speed on DP.

When the IC 11 is powered by the USB device when it is attached, the power-on-reset signal will reset the IC 11 when it reaches 2.3V. This signal stays at "1" until a DC/DC voltage regulator of the IC 11 is stable, e.g. for about 300 μs. When the power-on-reset signal falls to "0", it means the IC 11 supply is greater than 2.3V and the DC/DC is stable. The USB mode detector should be powered by the same voltage regulator as the IC 11 to be active as soon as possible. At power-on, the pull up resistor 44 on D-minus DM is not active until the voltage regulator (VTERM) is turned on by the IC 11. The microprocessor 14 reads the control register 42 for the indication of the mode in which to operate. For the USB mode, the microprocessor 14 starts the voltage regulator of the USB protocol. In this condition, the two pull down resistors of the USB hub which are now connected to the D-plus DP and D-minus DM pads, create a "0" state on the bus of the USB device. The trailing edge of the power-on-reset signal can create a pulse of 1 ms via delay block 36 during which the mode configuration circuit will detect the USB mode. However, this time can be increased, e.g. to 10 ms, if it is necessary to ensure that it works accurately during a slow insertion of the medium, e.g. the smart card 10, in the USB reader.

Thus, preferably, the USB mode detector 34 detects the "0" state on the D-plus and D-minus pads when the power-on-reset signal falls to "0". If so, then the USB voltage detector 30 detects whether a power supply on the voltage supply pad VCC is greater than about 3.5 volts or preferably between about 4.01 and 5.5 volts to verify that the medium with the dual-mode IC 11 is communicating with a USB device.

So, in sum, for ISO mode, the mode configuration circuit 18 sets the switching block 16 in ISO mode which starts the IC 11 in the ISO mode. The USB pads DP, DM and the mode configuration circuit 18 may then be disabled. For the USB mode, the mode configuration circuit 18 sets the switching block 16 in USB mode which starts the IC 11 in the USB mode. The microprocessor 14 verifies that there is a USB cable attached and then enables the voltage regulator providing VTERM to the DM pad via resistor 44. The mode configuration circuit 18 and the ISO pads may then be disabled.

A system using such an IC 11 in accordance with the present invention includes a ISO-compliant reader and a USB-compliant reader. The ISO-protocol reader may be a conventional smart card reader that would provide the necessary signals at the appropriate pads of the external interface 12 of the IC 11 as would be appreciated by the skilled artisan. Thus, when a smart card 10 including the dual mode IC 11 is inserted into a conventional smart card reader, the mode configuration circuit 18 configures the IC 11 in the ISO mode because the USB-mode condition is not detected on the D-plus and D-minus pads. However, a USB-compliant reader would create the USB-mode condition on the D-plus and D-minus pads. So, when the smart card 10, or other medium, is connected to such a USB-compliant reader, the mode configuration circuit 18 configures the IC 11 in the USB mode because the USB-mode condition is detected.

Figure 4:
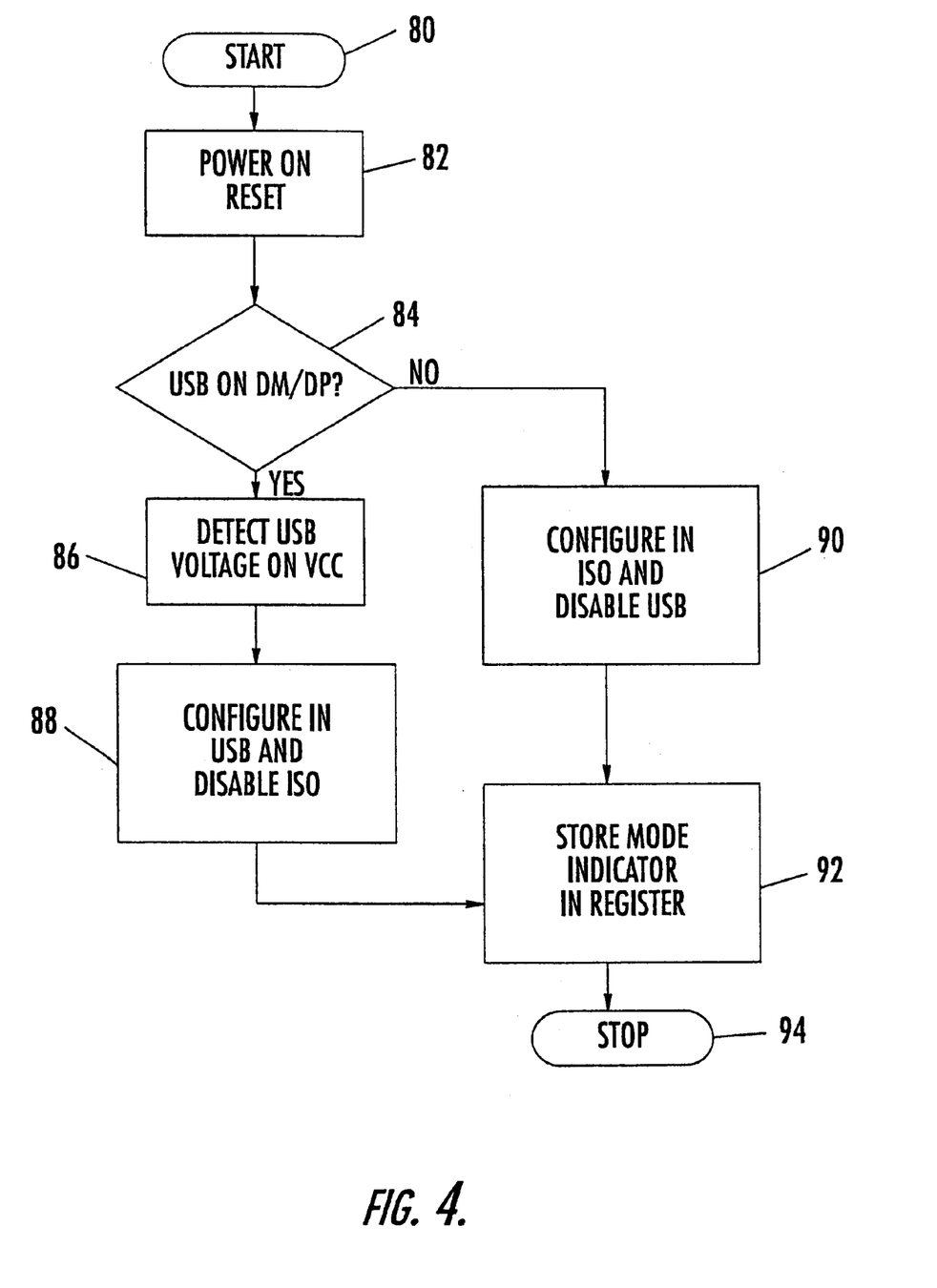
FIG. 4 is a flowchart generally illustrating the steps of a method of operating the dual mode IC of the first embodiment.

A method aspect of the first embodiment of the present invention will now be discussed while referring to FIG. 4. The method includes operating a dual-protocol smart card 10 in a first mode in accordance with an ISO protocol, and a second mode in accordance with a non-ISO protocol, such as the USB protocol. As discussed above, the dual-protocol smart card 10 includes an external interface 12 having a voltage supply pad VCC, a reference voltage/ground pad GND, a first set of pads CLK, RST, I/O in accordance with the ISO protocol, and a second set of pads, e.g. DP, DM, in accordance with the non-ISO protocol such as USB.

The method begins (block 80) and a power-on-reset sequence of the IC 11 is started at block 82. Then, at block 84, the method includes detecting whether a USB-mode condition exists on at least one of the DM and DP pads during the power-on-reset of the dual-mode IC. For security and integrity of the IC 11, the mode should be detected as soon as possible because once the IC is configured in a mode, it will not be changed until another power-on-reset is executed. In this embodiment, the IC 11 is configurable in the ISO mode by default. In other words, if the USB mode is not detected at block 84, then the IC 11 is configured in the ISO mode and the USB mode and interface are disabled (block 90) by connecting the DP and DM pads to GND, for example. Alternatively, if the USB-mode condition is detected at block 84, then the IC 11 is configured in the USB mode, and the first set of pads, i.e. CLK, RST, I/O, in accordance with the ISO protocol is disabled (block 88) by connecting them to GND, for example.

The method may include verifying the USB mode, when the USB-mode condition is detected at block 84, by detecting a USB-mode voltage on the voltage supply pad VCC (block 86). The method may include storing a mode configuration indicator for indicating whether the dual-mode IC is configured in the ISO or USB mode (block 92) before ending at block 94.

For example, the IC 11 is configured in the ISO mode if a USB-mode condition detected is not detected on the at least the DM pad. Preferably, if a USB device is detected via the DM or DP pads during the power-on reset sequence, then a USB voltage is verified on the voltage supply pad VCC before the IC 11 is configured in the USB mode. Once the IC 11 is configured in one mode, it can only operate in that mode and it cannot be changed except via another power-on-reset sequence. To prevent any glitches, the detected mode is preferably latched and a mode configuration indicator/bit is set. The operating system of the IC 11 will then check this bit during the reset routine to access the appropriate code for the latched mode.

Figure 5:
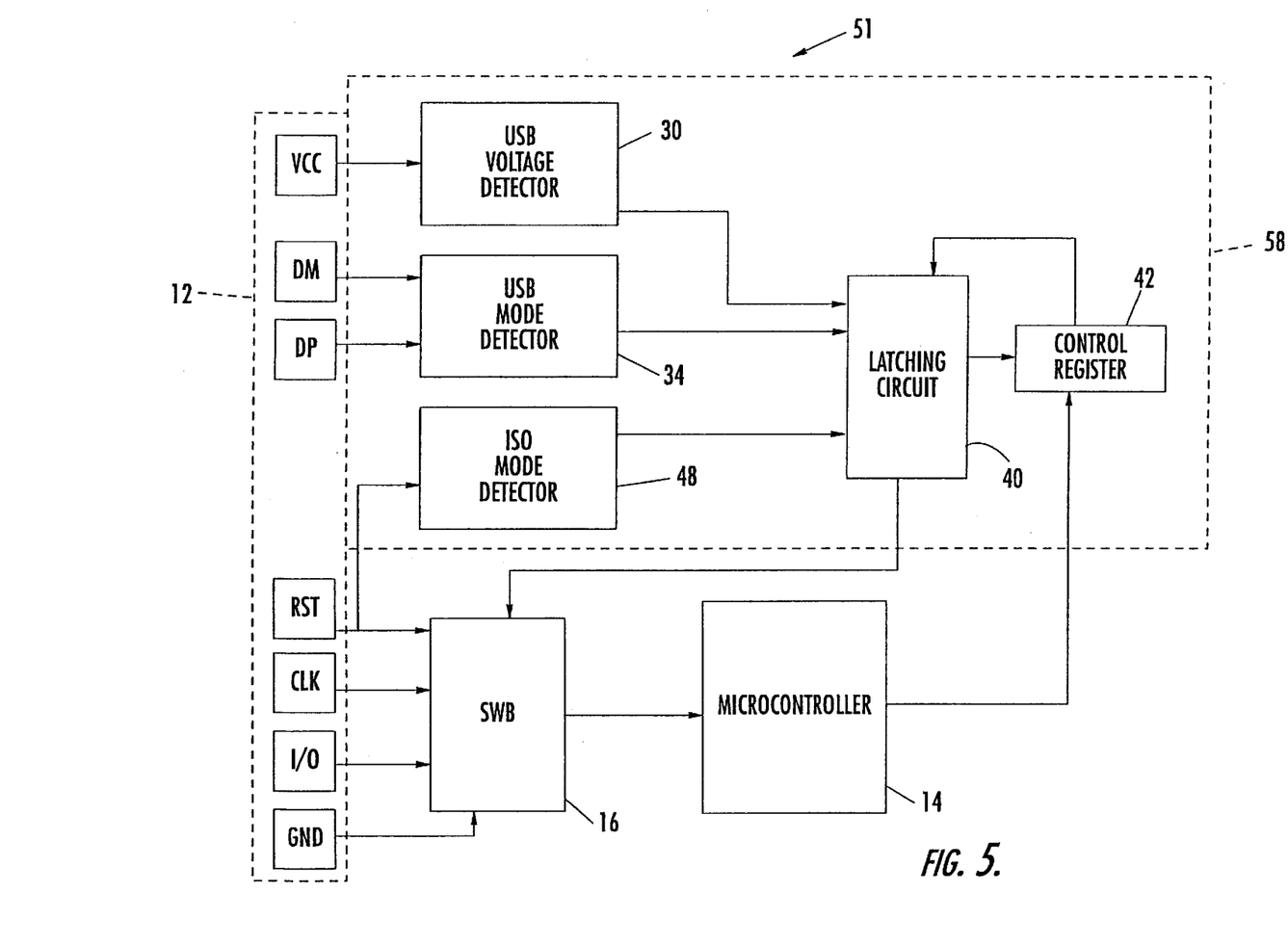
FIG. 5 is a schematic diagram of a dual-mode IC according to a second embodiment of the present invention.
Figure 6:
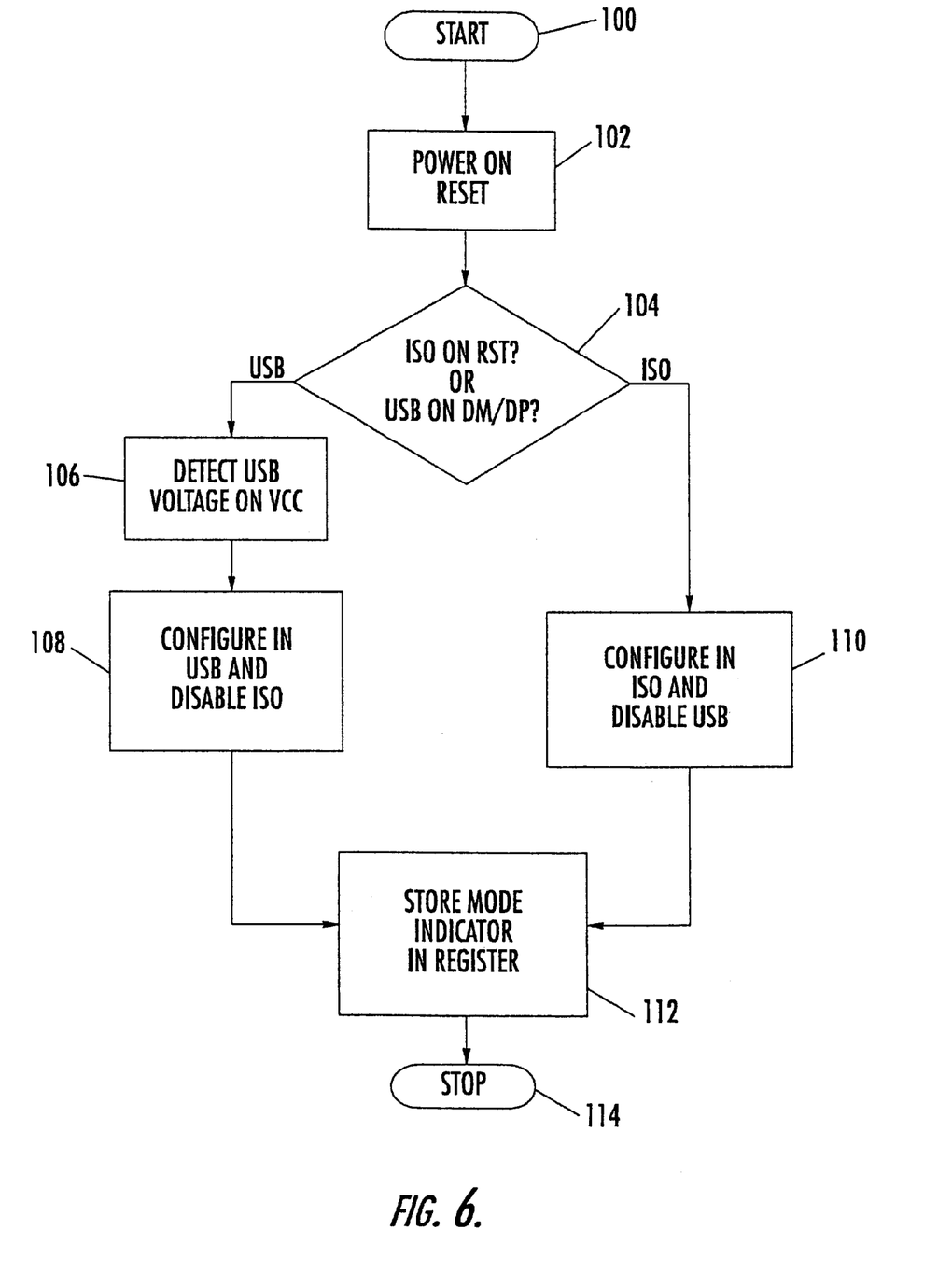
FIG. 6 is a flowchart generally illustrating the steps of a method of operating the dual mode IC of the second embodiment.

A second embodiment of the present invention will now be described while referring to FIGS. 5 and 6. The second embodiment of the dual-mode IC 51 is substantially similar to the first embodiment dual-mode IC 11 except here the mode configuration circuit 58 includes an ISO-mode detector 48 connected between the latching circuit 40 and the reset pad RST of the external interface 12. Specifically, instead of the mode configuration circuit 58 configuring the IC 51 in an ISO mode by default when a USB-mode condition is not detected, a detection for an ISO-mode condition will be performed before the mode configuration circuit 58 will configure the IC 51.

The advantage of this embodiment is the avoidance of a erroneous detection of the non-selected mode during the time the IC 51 is being configured and the mode configuration indicator/bit is being read by the microprocessor 14. The ISO-mode condition that is detected is preferably the rising of the signal on the reset pad RST from a low to a high level. Again, preferably, if the USB mode detector 34 detects the "0" state on the D-plus and D-minus pads when the power-on-reset signal falls to "0", then the USB voltage detector 30 detects whether a power supply on the voltage supply pad VCC is greater than about 3.5 volts or preferably between about 4.01 and 5.5 volts to verify that the medium with the dual-mode IC 51 is communicating with a USB device.

A method aspect of the second embodiment of the present invention will now be discussed while referring to FIG. 6. The method includes operating a dual-protocol smart card 10 in a first mode in accordance with an ISO protocol, and a second mode in accordance with a non-ISO protocol, such as the USB protocol. As discussed above, the dual-protocol smart card 10 includes an external interface 12 having a voltage supply pad VCC, a reference voltage/ground pad GND, a first set of pads CLK, RST, I/O in accordance with the ISO protocol, and a second set of pads, e.g. DP, DM, in accordance with the non-ISO protocol such as USB.

The method begins (block 100) and a power-on-reset sequence of the IC 51 is started at block 102. Then, at block 104, the method includes detecting whether a USB-mode condition exists on at least one of the DM and DP pads or whether an ISO-mode condition exists on one of the first set of pads, such as the reset pad RST, during the power-on-reset of the dual-mode IC 51. Again, for security and integrity of the IC 51, the mode should be detected as soon as possible because once the IC is configured in a mode, it will not be changed until another power-on-reset is executed. In this embodiment, the IC 51 is configurable in the ISO mode if an ISO-mode condition is detected. If so, then the IC 51 is configured in the ISO mode and the USB mode and interface are disabled (block 110) by connecting the DP and DM pads to GND, for example. Alternatively, if the USB-mode condition is detected at block 104, then the IC 51 is configured in the USB mode, and the first set of pads, i.e. CLK, RST, I/O, in accordance with the ISO protocol is disabled (block 108) by connecting them to GND, for example.

As in the first embodiment, the method may include verifying the USB mode, when the USB-mode condition is detected at block 104, by detecting a USB-mode voltage on the voltage supply pad VCC (block 106). Also, the method may include storing a mode configuration indicator for indicating to the microprocessor whether the dual-mode IC is configured in the ISO or USB mode (block 112) before ending at block 114.

For example, the IC 51 is configured in the ISO mode if a ISO-mode condition is detected on the reset pad RST. Preferably, if a USB device is detected via the DM or DP pads during the power-on reset sequence, then a USB voltage is verified on the voltage supply pad VCC before the IC 51 is configured in the USB mode. As discussed previously, once the IC 51 is configured in one mode, it can only operate in that mode and it cannot be changed except via another power-on-reset sequence. To prevent any glitches, e.g. a mode change, the detected mode is preferably latched and a mode configuration indicator/bit is set. The operating system of the IC 51 will then check this bit during the reset routine to access the appropriate code for the latched mode.

Thus, first and second embodiments of a dual-mode IC 11, smart card 10, system and associated method of operation in the ISO 7816 protocol and the USB protocol have been described in accordance with the present invention. A medium, such as the smart card 10, incorporating the dual-mode IC 11, 51 can be used in a typical ISO compliant smart card reader or in a lower-cost USB device, such as a personal computer 20.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A dual-mode integrated circuit (IC) for operating in an ISO mode in accordance with International Standards Organization 7816 (ISO 7816) protocol, and a USB mode in accordance with a Universal Serial Bus protocol, the dual-mode IC comprising:
   a microprocessor;
   a switching block connected to the microprocessor;
   an external interface connected to the switching block and comprising
      a voltage supply pad,
      a reference voltage pad,
      a reset pad, a clock pad and an input/output pad in accordance with the ISO 7816 protocol, and
      a D-plus pad and a D-minus pad in accordance with the USB protocol; and
   a mode configuration circuit connected to the switching block for configuring the dual-mode IC in one of the ISO and USB modes based upon a signal on at least one of the D-plus and D-minus pads.

2. The dual-mode IC according to claim 1 wherein the mode configuration circuit comprises:
   a USB mode detector connected to at least the D-minus pad for detecting a USB condition; and
   a latching circuit connected to the switching block and receiving an output from the USB mode detector.

3. The dual-mode IC according to claim 2 wherein the mode configuration circuit configures the dual-mode IC in the USB mode if a USB condition is detected by the USB mode detector, and configures the dual-mode IC in the ISO mode if a USB condition is not detected by the USB mode detector.

4. The dual-mode IC according to claim 2 wherein the USB mode detector is also connected to the D-plus pad.

5. The dual-mode IC according to claim 2 wherein the mode configuration circuit further comprises an ISO mode detector connected between the reset pad and the latching circuit for detecting an ISO condition.

6. The dual-mode IC according to claim 5 wherein the mode configuration circuit configures the dual-mode IC in the USB mode if a USB condition is detected by the USB mode detector, and configures the dual-mode IC in the ISO mode if an ISO condition is detected by the ISO mode detector.

7. The dual-mode IC according to claim 2 further comprising a control register connected to the latching circuit for storing a mode configuration indicator.

8. The dual-mode IC according to claim 2 further comprising a USB voltage detector connected between the voltage supply pad and the latching circuit to detect a USB voltage supply.

9. The dual-mode IC according to claim 1 wherein the mode configuration circuit configures the dual-mode IC to operate in one of the ISO and USB modes while disabling the other of the ISO and USB modes.

10. The dual-mode IC according to claim 9 wherein the reset, clock and input/output pads are disabled when the dual-mode IC is configured in the non-ISO mode, and the D-plus and D-minus pads are disabled when the dual-mode IC is configured in the ISO mode.

11. A dual-mode smart card for operating in an ISO mode in accordance with International Standards Organization 7816 (ISO 7816) protocol, and a USB mode in accordance with a Universal Serial Bus protocol, the dual-mode smart card comprising:
   a card body; and
   a dual-mode integrated circuit (IC) carried by the card body and comprising
      an external interface including
         a voltage supply pad,
         a reference voltage pad,
         a first set of pads including a reset pad, a clock pad and an input/output pad in accordance with the ISO 7816 protocol, and
         a second set of pads including a D-plus pad and a D-minus pad in accordance with the USB protocol, and
      a mode configuration circuit for configuring the dual-mode IC in one of the ISO and USB modes and comprising
         a USB mode detector connected to at least the D-minus pad for detecting a USB condition, and
         a latching circuit connected to the USB mode detector.

12. The dual-mode smart card according to claim 11 wherein the mode configuration circuit configures the dual-mode IC in the USB mode if a USB condition is detected by the USB mode detector, and configures the dual-mode IC in the ISO mode if a USB condition is not detected by the USB mode detector.

13. The dual-mode smart card according to claim 11 wherein the USB mode detector is also connected to the D-plus pad.

14. The dual-mode smart card according to claim 11 wherein the dual mode IC further comprises an ISO mode detector connected between the reset pad and the latching circuit for detecting an ISO condition.

15. The dual-mode smart card according to claim 14 wherein the mode configuration circuit configures the dual-mode IC in the USB mode if a USB condition is detected by the USB mode detector, and configures the dual-mode IC in the ISO mode if an ISO condition is detected by the ISO mode detector.

16. The dual-mode smart card according to claim 11 wherein the dual-mode IC further comprises a control register connected to the latching circuit for storing a mode configuration indicator.

17. The dual-mode smart card according to claim 11 wherein the mode configuration circuit further comprises a USB voltage detector connected between the voltage supply pad and the latching circuit to detect a USB voltage supply.

18. The dual-mode smart card according to claim 11 wherein the mode configuration circuit configures the dual-mode IC to operate in one of the ISO and non-ISO modes while disabling the other of the ISO and non-ISO modes.

19. The dual-mode smart card according to claim 18 wherein the reset, clock and input/output pads are disabled when the dual-mode IC is configured in the USB mode, and the D-plus and D-minus pads are disabled when the dual-mode IC is configured in the ISO mode.

20. A dual-mode smart card system for operating in an ISO mode in accordance with International Standards Organization 7816 (ISO 7816) protocol, and a USB mode in accordance with a Universal Serial Bus protocol, the dual-mode smart card system comprising:

a dual-mode smart card including a dual-mode integrated circuit (IC) comprising
an external interface including
a voltage supply pad,
a reference voltage pad,
a reset pad, a clock pad and an input/output pad in accordance with the ISO 7816 protocol, and
a D-plus pad and a D-minus pad in accordance with the USB protocol, and
a mode configuration circuit for configuring the dual-mode IC in one of the ISO mode and the USB mode and comprising
a USB mode detector connected to the D-minus pad, and
a latching circuit connected to the USB mode detector;

at least one of an ISO-compliant smart card reader and a USB-compliant smart card reader for reading the dual-mode smart card, the ISO-compliant smart card reader including an ISO interface having a plurality of contacts for respectively mating with the voltage supply pad, the reference voltage pad, the reset pad, the clock pad and the input/output pad in accordance with the ISO 7816 protocol, and the USB-compliant smart card reader including a USB interface having a plurality of contacts for respectively mating with the voltage supply pad, the reference voltage pad, the D-plus pad and the D-minus pad in accordance with the USB protocol.

21. The dual-mode smart card system according to claim 20 wherein the mode configuration circuit configures the dual-mode IC in the USB mode if a USB condition is detected by the USB mode detector, and configures the dual-mode IC in the ISO mode if a USB condition is not detected by the USB mode detector.

22. The dual-mode smart card system according to claim 20 wherein the USB mode detector is also connected to the D-plus pad.

23. The dual-mode smart card system according to claim 20 wherein the mode configuration circuit further comprises an ISO mode detector connected between the reset pad and the latching circuit for detecting an ISO condition.

24. The dual-mode smart card system according to claim 23 wherein the mode configuration circuit configures the dual-mode IC in the USB mode if a USB condition is detected by the USB mode detector, and configures the dual-mode IC in the ISO mode if an ISO condition is detected by the ISO mode detector.

25. The dual-mode smart card system according to claim 20 wherein the mode configuration circuit further comprises a control register connected to the latching circuit for storing a mode configuration indicator.

26. The dual-mode smart card system according to claim 20 wherein the mode configuration circuit further comprises a USB voltage detector connected between the voltage supply pad and the latching circuit to detect a USB voltage supply.

27. The dual-mode smart card system according to claim 20 wherein the mode configuration circuit configures the dual-mode IC to operate in one of the ISO and USB modes while disabling the other of the ISO and USB modes.

28. The dual-mode smart card system according to claim 27 wherein the reset, clock and input/output pads are disabled when the dual-mode IC is configured in the USB mode, and the D-plus and D-minus pads are disabled when the dual-mode IC is configured in the ISO mode.

29. A method of operating a dual-mode integrated circuit (IC) in an ISO mode in accordance with International Standards Organization 7816 (ISO 7816) protocol, and a USB mode in accordance with a Universal Serial Bus protocol, the dual-mode IC including an external interface having a voltage supply pad, a first set of pads including a reset pad, a clock pad and an input/output pad in accordance with the ISO protocol, and a second set of pads including a D-plus pad and a D-minus pad in accordance with the USB protocol, the method comprising:

detecting whether a USB-mode condition exists on at least one pad of the second set of pads;

configuring the dual-mode IC in one of the ISO mode and the USB mode based upon the detection; and disabling one of the first and second set of pads based upon the configuration.

30. The method according to claim 29 wherein detecting whether the USB-mode condition exists on at least one pad of the second set of pads comprises detecting whether the USB-mode condition exists during a power-on-reset of the dual-mode IC.

31. The method according to claim 29 wherein detecting whether the USB-mode condition exists on at least one pad of the second set of pads comprises detecting whether the USB-mode condition exists on the D-minus pad.

32. The method according to claim 29 wherein detecting whether the USB-mode condition exists on at least one pad of the second set of pads comprises detecting whether the USB-mode condition exists on the D-plus pad and the D-minus pad.

33. The method according to claim 29 wherein the dual-mode IC is configured in the USB mode when the USB-mode condition is detected, and configured in the ISO mode when the USB-mode condition is not detected.

34. The method according to claim 29 further comprising detecting whether an ISO-mode condition exists on one pad of the first set of pads during a power-on-reset of the dual-mode IC; wherein the dual-mode IC is configured in the USB mode upon the detection of the USB-mode condition, and configured in the ISO mode upon detection of the ISO-mode condition.

35. The method according to claim 34 wherein detecting whether the ISO-mode condition exists on one pad of the first set of pads comprises detecting whether the ISO-mode condition exists on the reset pad.

36. The method according to claim 29 further comprising verifying the USB mode, when the USB-mode condition is detected, by detecting a USB-mode voltage on the voltage supply pad.

37. The method according to claim 29 further comprising storing a mode configuration indicator for indicating whether the dual-mode IC is configured in the ISO or USB mode.

* * * * *